United States Patent [19]

Collins

[11] Patent Number: 4,882,647
[45] Date of Patent: Nov. 21, 1989

[54] COMBINATION APPARATUS FOR CLAMPING GROUND CONDUCTOR AND FOR MOUNTING LIGHTNING PROTECTOR

[75] Inventor: Thomas J. Collins, Wall Township, Monmouth County, N.J.

[73] Assignee: Keptel, Inc., Tinton Falls, N.J.

[21] Appl. No.: 284,671

[22] Filed: Dec. 15, 1988

[51] Int. Cl.⁴ .............................................. H01R 3/06
[52] U.S. Cl. ...................................... 361/119; 174/51; 361/427; 379/399; 439/97
[58] Field of Search ............... 361/117, 118, 119, 124, 361/331, 334, 356, 380, 417, 419, 420, 427; 174/51; 439/92, 95, 96, 97, 98, 922; 379/451, 399

[56] References Cited
U.S. PATENT DOCUMENTS

| 3,345,542 | 10/1967 | Paddock | 361/427 |
| 3,723,942 | 3/1973 | Dennison | 439/97 |
| 3,806,856 | 4/1974 | Virani | 439/97 |
| 4,315,100 | 2/1982 | Haslbeck | 174/51 |
| 4,552,421 | 11/1985 | Drapkin | 439/97 |
| 4,742,541 | 5/1988 | Cwirzen | 361/119 |

Primary Examiner—Gerald P. Tolin
Attorney, Agent, or Firm—R. Gale Rhodes, Jr.

[57] ABSTRACT

A combination apparatus is shown for clamping ground conducting means and for mounting lightning protecting means including an electrically conductive ground bracket formed integrally or of one piece, a ground clamp provided on the ground bracket for clamping a ground wire, first mounting means provided on top of the ground bracket for mounting the lightning protector on top of the ground bracket and second mounting means for mounting the ground bracket to structure to be grounded such as, for example, a telephone network interface device.

4 Claims, 4 Drawing Sheets

COMBINATION APPARATUS FOR CLAMPING GROUND CONDUCTOR AND FOR MOUNTING LIGHTNING PROTECTOR

BACKGROUND OF THE INVENTION

This invention relates to combination apparatus for clamping ground conductor means and for mounting lightning protector means and which combination apparatus is for being mounted on apparatus to be grounded.

Numerous apparatus are known to the art which are grounded, e.g. connected to earth ground to conduct electricity produced by a lightning strike to ground thereby preventing or reducing damage from a lightning strike.

An example of such apparatus is telephone network interface device which device, typically, is mounted on the wall of a subscriber premises and which interconnects incoming telephone lines with subscriber premises lines. To show utility of the present invention, and not by way of limitation, an example of such telephone network interface device is illustrated in FIG. 1 and identified by general numerical designation 10. The telephone network interface device 10 includes a base 12 to which are hingedly mounted a telephone company personnel cover 14 and a subscriber premises cover 16. The telephone network interface device 10 may be, for example, the telephone network interface device illustrated in U.S. Design Pat. No. 297,136 issued Aug. 9, 1988 and assigned to Keptel, Inc., the assignee of the present invention The telephone network interface device 10 of FIG. 1 includes a plurality of lightning protectors 17, 18, 19 and 20 provided at their tops, respectively, with a plurality of telephone terminals 22, 23, 24 and 25 for terminating incoming telephone lines (not shown). Further, the telephone network interface device 10 is provided with a plurality of subscriber terminals 27, 28, 29 and 30 for terminating subscriber premises lines (not shown). The subscriber terminals 27 and 28 and 29 and 30 are interconnected, respectively, to conductors 31 and 32 which terminate, respectively, in plugs 34 and 35 which are received or plugged into jacks 37 and 38. The jacks, in turn, are connected by conductors (not shown) to telephone terminals 22, 23, 24 and 25. The plugs 34 and 35 and jacks 37 and 38 provide demarcation points between the incoming telephone lines and the subscriber premises lines to facilitate determination of whether a fault exists on the incoming telephone lines or the subscriber premises lines, in the manner known to those skilled in the art.

As is known to those skilled in the telephone network interface device art, the lightning protectors 17, 18, 19 and 20 are mounted to the base 12 of the telephone network interface device by prior art apparatus indicated in FIG. 1 by general numerical designation 40 and which apparatus 40 is also for clamping one end of a ground wire 42 the other end of which is connected to earth ground; the prior art clamping apparatus 40 may also clamp a telephone company cable 43 including a plurality of incoming telephone lines 43B (FIG. 2) for interconnection with the telephone company terminals 22, 23, 24 and 25.

The prior art apparatus 40 may be better seen by reference to FIG. 2, and it will be understood, generally, that the combination apparatus for clamping a ground conductor and for mounting a lightning protector of the present invention is an improvement over such prior art apparatus 40.

The prior art apparatus 40, referring now to FIG. 2, includes a physically separate or distinct bracket 45 for being mounted to the bottom 13 (FIG. 1) of the base 12 of the telephone network interface device 10 by threaded fasteners (not shown) inserted through aperture 46 and 47, a physically separate or distinct electrically conductive member 48, and a clamping frame 49. An electrically conductive threaded stud 51 is provided on the top of the bracket 46; as indicated by the dashed lines 55, 56 and 57, the stud 51 is for receiving the outwardly extending electrically conductive connectors 53 and 54 provided on the lightning protectors and the electrically conductive member 48, and which stud 51 in combination with the nut 58 is for mounting and electrically interconnecting the lightning protectors 17, 18, 19 and 20 and electrically conductive member 48. It will be noted particularly that the electrically conductive member 48 is mounted on top of the bracket 45 along with the lightning protectors 17, 18, 19 and 20. The mounting frame 49, FIG. 2, is for being placed over the outer end 61 of the electrically conductive member 48 and upon the ground wire 42 and the ground shield 43A of the telephone cable 43 and the ground wire 42 being placed in the clamping frame 49 the clamping screw 64 is for being threaded inwardly to clamp and electrically interconnect the ground wire 42, the ground shield 43A and the electrically conductive member 48 and thereby in turn electrically interconnect the lightning protectors 17, 18, 19 and 20 to the ground wire 42 and hence to earth ground.

As may be understood by further reference to FIG. 2, the prior art apparatus 40, by being comprised of a plurality of physically separate and distinct members as noted above, is undesirably difficult and time consuming to interconnect to the lightning protectors, ground wire, cable ground shield, and more importantly, as will be further understood, the electrically conductive member 48 upon being mounted to the top of the bracket 45 with the lightning protectors must be undesirably disconnected from the telephone network interface device 10 (FIG. 1) upon the nut 58 being unscrewed or removed to replace the lightning protectors 17, 18, 19 and 20. Such removal of the electrically conductive member 48 renders the telephone network interface device 10 (FIG. 1) ungrounded and thereby subject to lightning damage It has been found that telephone company personnel upon unscrewing the nut 58 to replace or re-wire the lightning protectors 17, 18, 19 and 20 occasionally, inadvertently, forget to reconnect the electrically conductive member 48 thereby leaving the telephone network interface device 10 ungrounded and subject to lightning damage.

Accordingly, there exists a need in the art for new and improved apparatus for both clamping a ground wire and for mounting lightning protectors which is comprised of fewer parts to facilitate mounting to the telephone network interface device and to facilitate interconnection with the lightning protectors, ground wire, etc. Still further, there exists a need for combination ground wire clamping apparatus and lightning protector mounting apparatus which remains mounted to the telephone network interface and electrically interconnected to the ground wire upon the lightning protectors being removed disconnected, such as for removal and replacement, to prevent the telephone network interface device from being inadvertently left ungrounded as described above.

SUMMARY OF THE INVENTION

It is the object of the present invention to provide the needed combination ground wire clamping apparatus and lightning protector mounting means noted above.

Such combination apparatus may include an electrically conductive ground bracket formed integrally or of one piece, a ground clamp provided on the ground bracket for clamping a ground wire, first mounting means provided on top of the ground bracket for mounting the lightning protector on top of the ground bracket and second mounting means provided on the ground bracket for mounting the ground bracket to structure to be grounded such as, for example, the above-noted telephone network interface device.

DESCRIPTION OF THE PREFERRED EMBODIMENT

Figure 1:
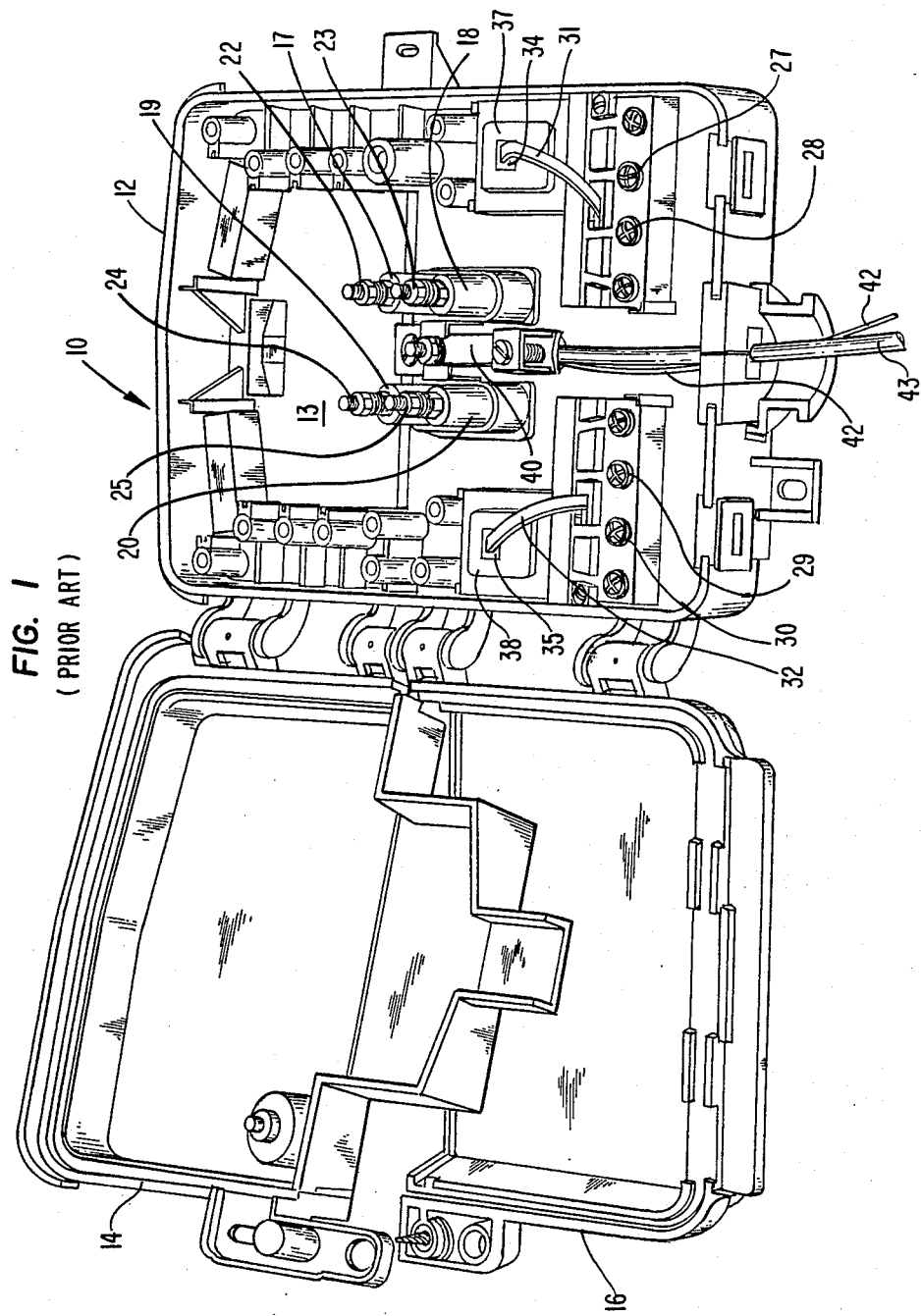
FIG. 1 is a perspective view of telephone network interface device including a telephone company personnel door and a subscriber premises door mounted hingedly to a base, which doors are shown in the open position, and which telephone network interface device is provided with prior art apparatus for clamping a ground wire, etc. and for mounting lightning protectors.
Figure 2:
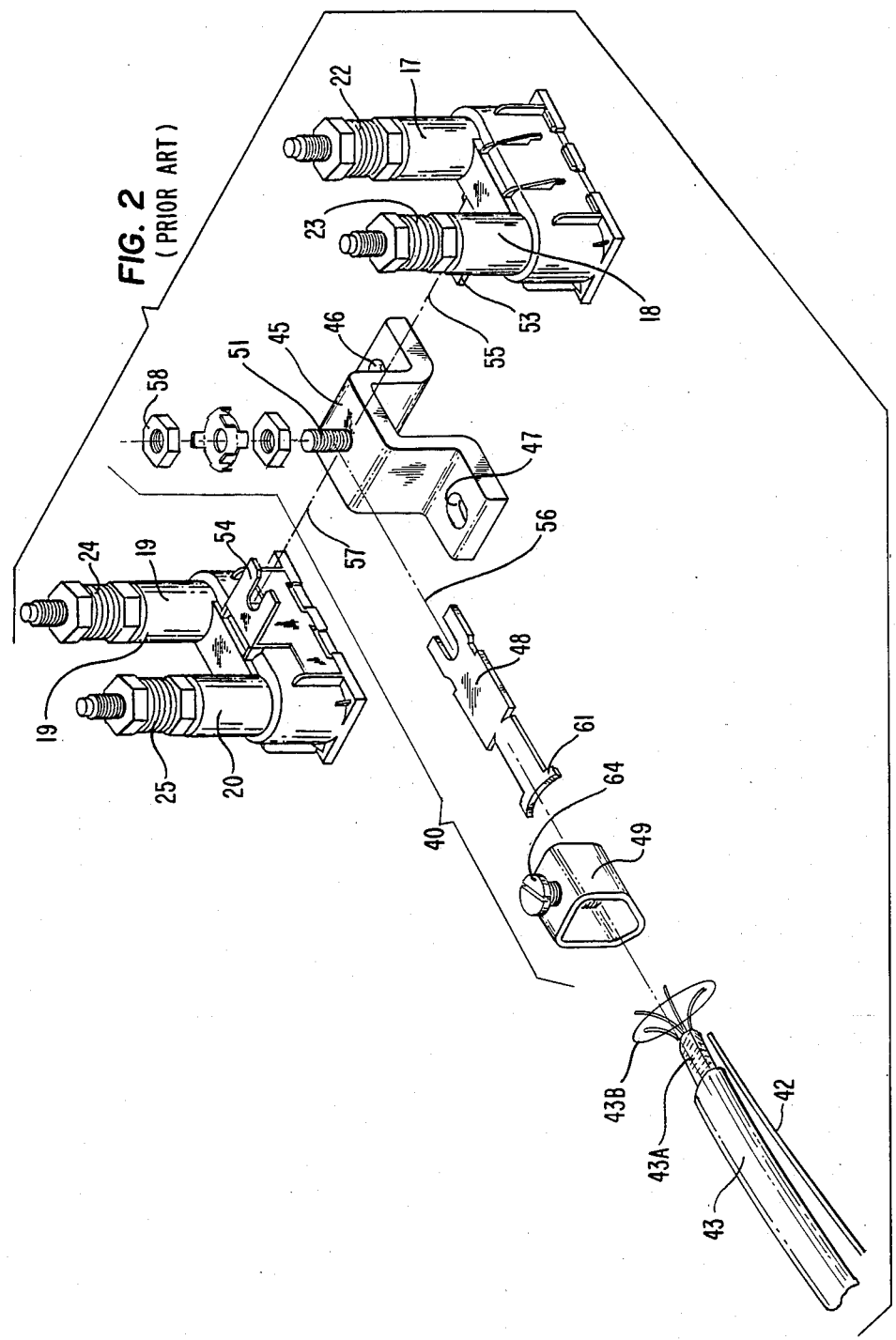
FIG. 2 is an exploded view of the prior art apparatus for clamping a ground wire, etc. and for mounting lightning protectors.
Figure 3:
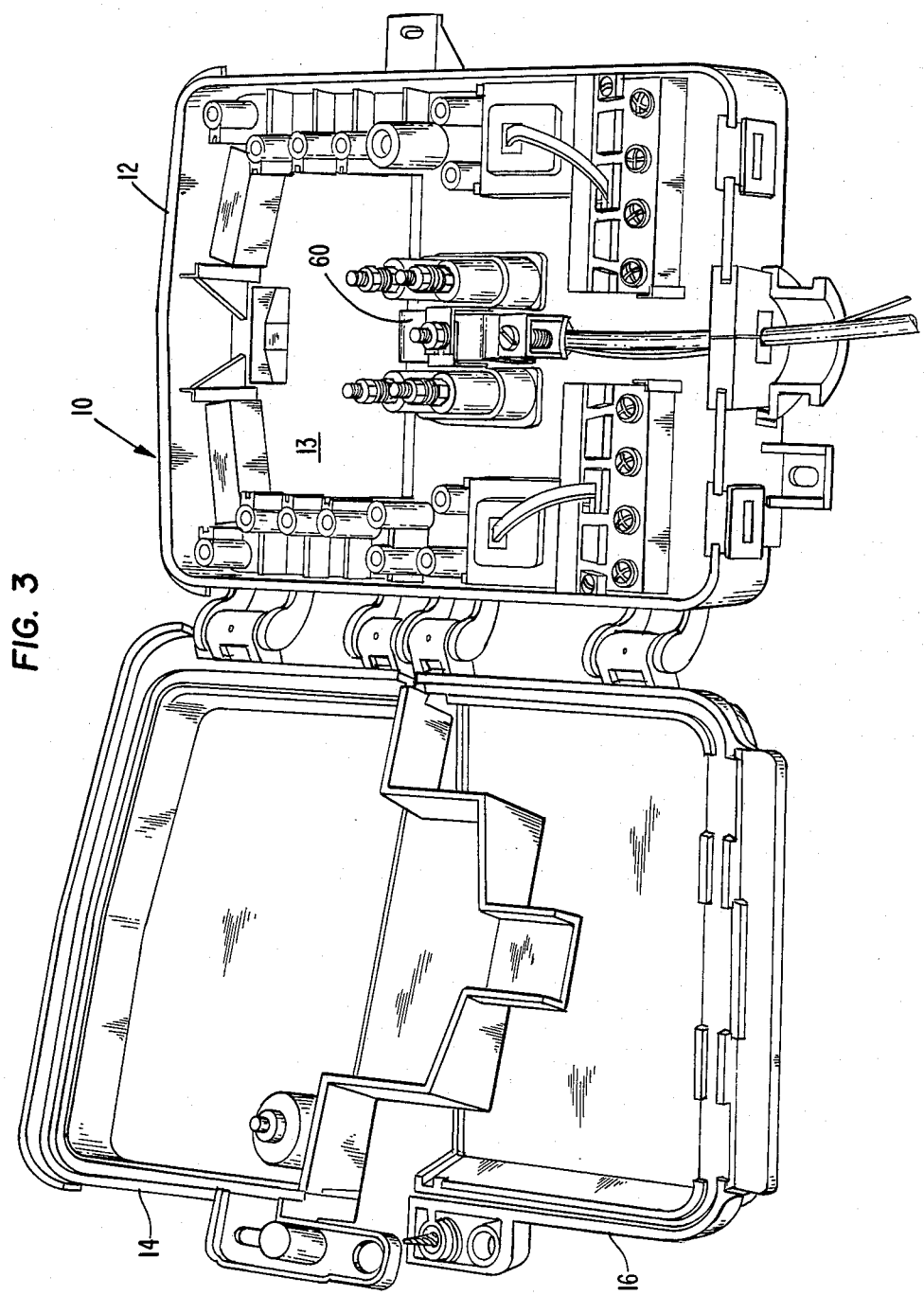
FIG. 3 is a view similar to FIG. 1 but showing combination apparatus embodying the present invention for clamping a ground wire, etc. and for mounting lightning protectors.

Referring now to FIG. 3, it will be understood that the telephone network interface device 10 of FIG. 1 is also shown in FIG. 3 with the component parts thereof given the same numerical designations as in FIG. 1 for convenience of reference and understanding. However, in FIG. 3, instead of the prior art apparatus 40 for mounting the lightning protectors and clamping the ground wire being shown, the combination apparatus of the present invention for clamping ground conducting means and for mounting lightning protector means is shown and is given general numerical designation 60.

Figure 4:
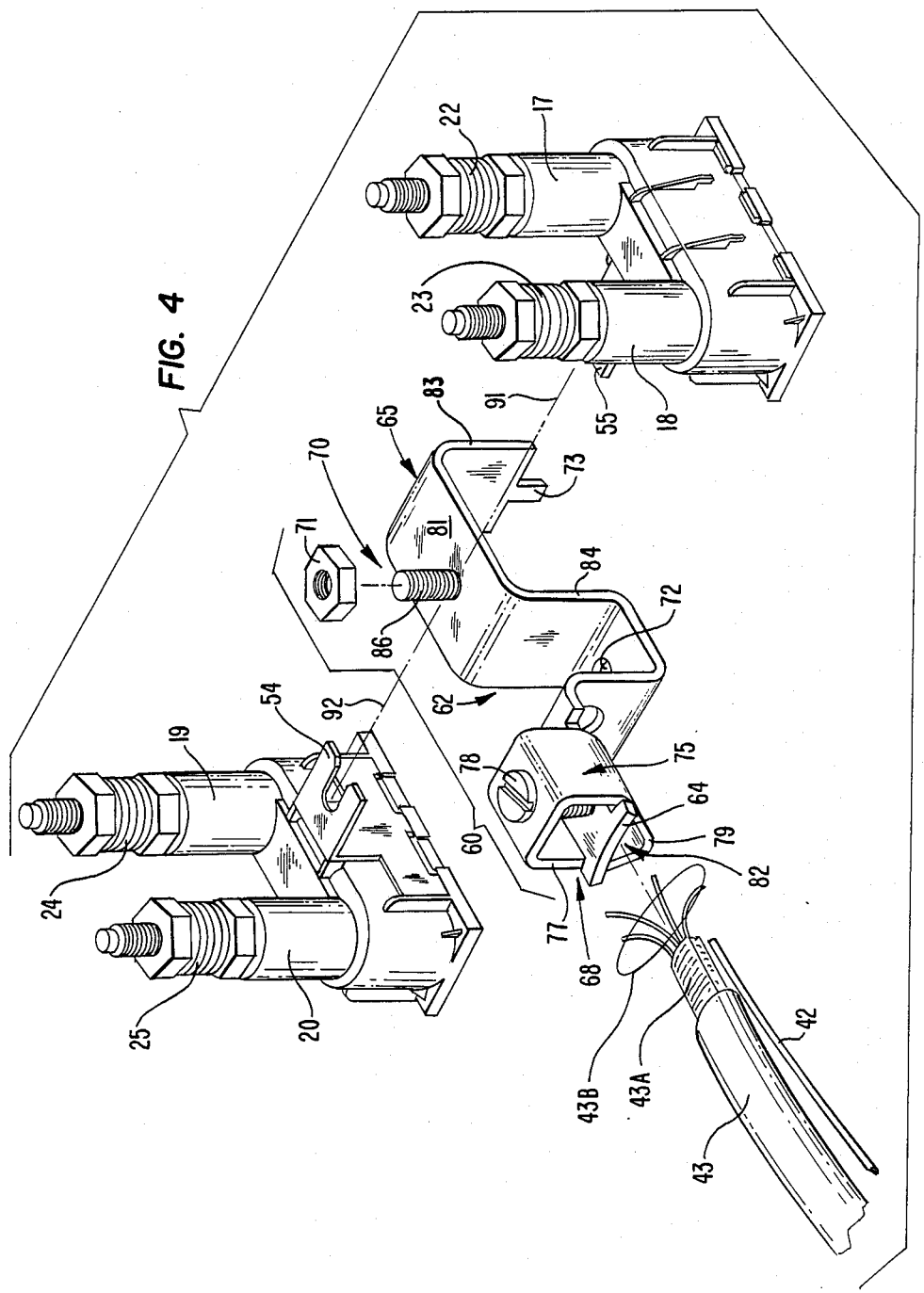
FIG. 4 is an exploded view of the combination apparatus embodying the present invention for clamping a ground wire, etc. and for mounting lightning protectors.

Such combination apparatus 60 may be better seen and understood from the exploded illustration of FIG. 4 to which reference is now made. The apparatus 60 may include an integrally formed, one-piece, electrically conductive ground bracket indicated by general numerical designation 62 and which bracket may include an outwardly extending, upwardly curved first end portion 64 and an upwardly extending second end portion indicated by general numerical designation 65.

Clamping means, indicated by general numerical designation 68, are provided on the ground bracket 62 which clamping means 68 are for clamping ground conducting means such as the ground wire 42 and the grounded shield 43A of the telephone company cable 43.

First mounting means indicated by general numerical designation 70 are also provided on the ground bracket 62 for mounting lightning protecting means, such as lightning protectors 17, 18, 19 and 20, on the top of the ground bracket 62.

Second mounting means are also provided on the ground bracket 62 for mounting the ground bracket to the bottom 13 (FIG. 3) of the telephone network interface device 10. Such second mounting means may include an aperture 72 for receiving a threaded fastener to fasten the ground bracket 62 to the bottom 13 of the telephone network interface device 10 and may further include a downwardly extending tang 73 for being received in the suitable hole or opening (not shown) formed in the bottom 13 of the telephone network interface device 10.

More particularly, it will be understood that the clamping means 68 includes a clamping frame indicated by general numerical designation 75 which surrounds the outwardly extending upwardly curved first end portion 64 of the ground bracket 62 and which clamping frame 75 includes an upwardly extending top portion 77 provided with a threaded aperture (not shown) for threadedly receiving a ground conductor means securing screw 78; the clamping frame 68 further includes a downwardly extending bottom portion 79. The downwardly extending bottom portion 79 in combination with the outwardly extending upwardly curved first end portion 64 of the ground bracket 62 provides an opening indicated by general numerical designation 82 for receiving the ground conductor means, e.g. the ground wire 42 and the ground shield 43A of telephone company cable 43. Upon the screw 78 being screwed into the aperture (not shown) provided in the top of the upper portion 77 of the clamping frame 75, the outwardly extending upwardly curved first end portion 64 of the ground bracket 62 is forced towards the downwardly extending portion 79 of the clamping frame 78 to clamp and electrically interconnect the ground wire 42 and ground shield 43A to the ground bracket 62.

Continuing reference to FIG. 4, it will be understood that the upwardly extending second end portion 65 of the ground bracket 62 comprises an upwardly extending, generally inverted U-shaped portion as shown including a base 81 and two downwardly extending legs 83 and 84 with the tang 73 being provided at the end or bottom of the leg 83. It will be further understood that the first mounting means 70 may include a threaded stud 86 fixedly secured to and extending upwardly from the base 81 of the upwardly extending second end portion 65 of the ground bracket 62 and a nut 70. As indicated by the dashed lines 91 and 92, the threaded stud 86 is for receiving the outwardly extending electrically conductive connecting members 54 and 55 provided on the lightning protectors 17, 18, 19 and 20 and, upon the nut 70 being threaded downwardly onto the stud 86, the outwardly extending, electrically conductive connecting means 54 and 55 of the lightning protectors are clamped to, and electrically interconnected to, the ground bracket 62.

It will be understood by those skilled in the art that by the ground bracket 62 being formed integrally in accordance with the teachings of the present invention, instead of the physically distinct or separate bracket 45 and member 48 of FIG. 1, upon the ground wire 42 and ground shield 43A of the telephone cable 43 being clamped by the clamping apparatus 68 and upon the nut 70 being loosened and the lightning protectors 17, 18, 19 and 20 being removed from the ground bracket 62, the ground bracket 62 remains mounted to the telephone network interface device 10 of FIG. 3 and connected to the ground wire 42 and hence the telephone network interface device 10 in turn remains grounded at all times and inadvertent un-grounding of the ground of the telephone network interface device is prevented. Still further, it will be appreciated that the integral forming of the ground bracket 62 facilitates mounting to the telephone network interface device 10 and clamping to the ground wire 42 and ground shield 43A of the telephone cable 44 and thus facilitates installation.

It will be understood that many variations and modifications may be made in the present invention without departing from the spirit and the scope thereof.

What is claimed is:

1. Combination apparatus for clamping ground conducting means and for mounting lightning protecting means, said combination apparatus for being mounted on apparatus to be grounded, comprising:

an integrally formed, electrically conductive ground bracket including an outwardly extending upwardly curved first end portion and an upwardly extending second end portion;

a clamping frame surrounding said outwardly extending upwardly curved first end portion of said ground bracket, said clamping frame including an upwardly extending top portion provided with a threaded aperture and a downwardly extending bottom portion which bottom portion in combination with said outwardly extending upwardly curved first end portion of said ground bracket provides an opening for receiving said ground conductor means;

a ground conductor means securing screw extending through said threaded aperture and for being screwed into said aperture to force said outwardly extending upwardly curved first end portion of said ground bracket and said downwardly extending bottom portion of said clamping frame in towards each other to clamp said ground conductor means therebetween;

first mounting means provided on said ground bracket for mounting said lighting protecting means on top of said ground bracket; and second mounting means provided on said ground bracket for mounting said ground bracket on said structure to be grounded.

2. Clamping apparatus according to claim 1 wherein said said first mounting means comprise:

a threaded stud extending upwardly from said upwardly extending second end portion of said ground bracket and said stud for receiving an outwardly extending, electrically conductive connecting member mounted on said lightning protector means, and a nut for threadedly engaging said threaded stud to clamp said outwardly extending, electrically conductive connecting member of said lightning protector means to said ground bracket.

3. Combination apparatus according to claim 2 wherein said second mounting means are provided on said second end portion of said ground bracket and wherein said second mounting means comprise an aperture for receiving a threaded fastener for fastening said ground bracket to said apparatus to be grounded.

4. Combination apparatus according to claim 3 wherein said upwardly extending second end portion of said ground bracket comprises an upwardly extending, generally inverted U-shaped portion including a base and two downwardly extending legs, wherein said threaded mounting stud is secured to and extends upwardly from said base and wherein said tang extends downwardly from one of said legs.

* * * * *